W. BIRCH.
Squeezing Machine for Bleachers and Dyers.
No. 200,427. Patented Feb. 19, 1878.
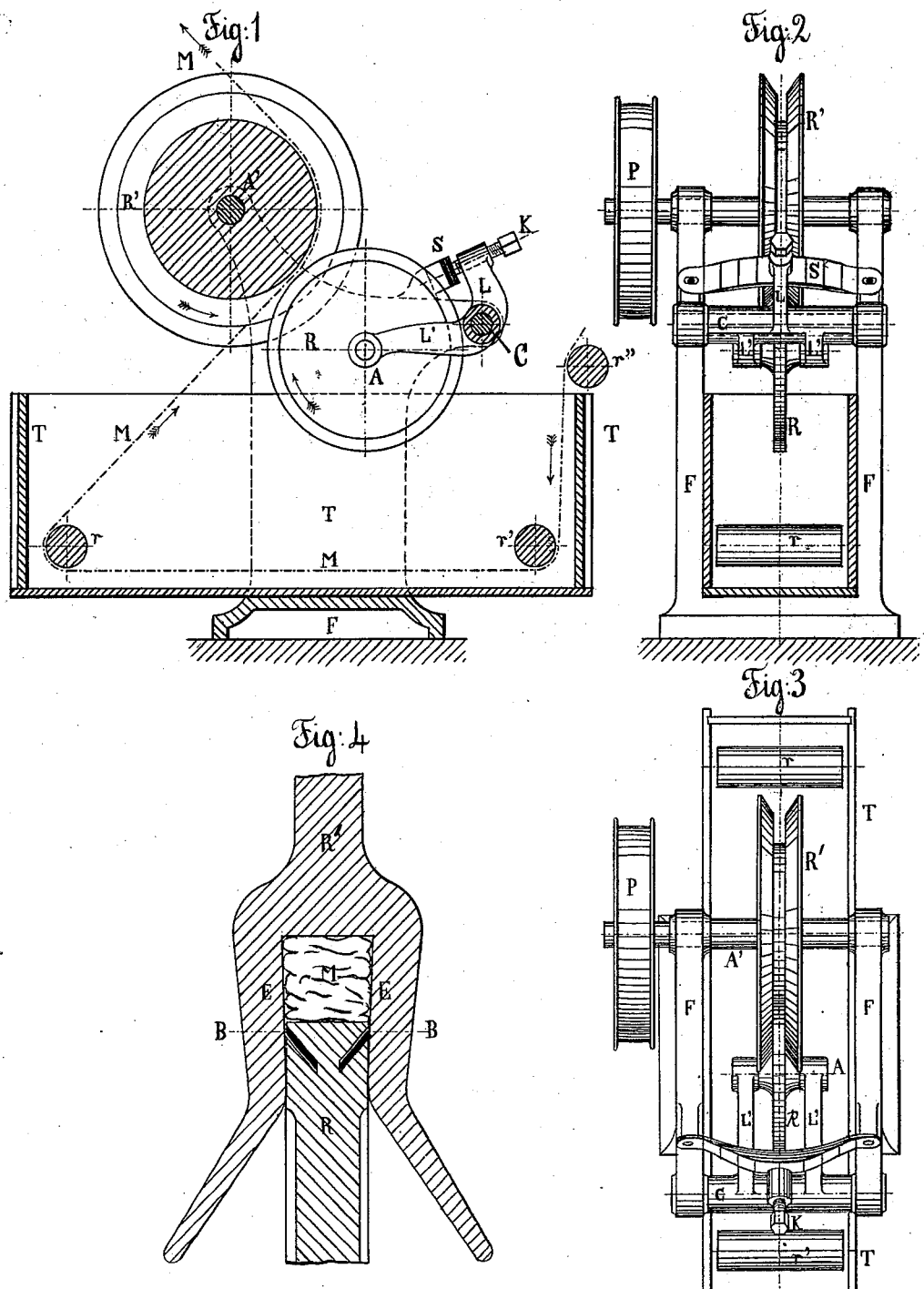

UNITED STATES PATENT OFFICE.

WILLIAM BIRCH, OF SALFORD, GREAT BRITAIN.

IMPROVEMENT IN SQUEEZING-MACHINES FOR BLEACHERS AND DYERS.

Specification forming part of Letters Patent No. 200,427, dated February 19, 1878; application filed November 26, 1877.

*To all whom it may concern:*

Be it known that I, WILLIAM BIRCH, of Salford, in the county of Lancaster, in England, Great Britain, have invented a new and Improved Squeezing-Machine, of which the following is a specification:

In the accompanying drawings, Figure 1 represents a sectional elevation; Fig. 2, a back view; Fig. 3, a top view or plan; Fig. 4, an enlarged section of the edges of the two rollers with the work-piece between them.

Similar letters of reference indicate corresponding parts.

The object of my invention is to provide a squeezer for the use of bleachers, dyers, calico-printers, and others, the rollers of which shall not require replacing as frequently as is the case with those at present in use, and which shall consequently be more durable and convenient, and less expensive.

The materials employed for the rollers of squeezers are generally maple or sycamore, cotton, rubber, or other flexible material being sometimes used. The latter are very expensive, and the former wear out very rapidly, and become, therefore, equally objectionable, particularly as those woods are very scarce in some districts.

To avoid these objections I make the rollers of metal or other hard material; and, in order to compensate for the absence of that degree of flexibility possessed by the materials hitherto used, I contract both the material to be squeezed and the face or length of the rollers into the narrowest possible limits, the rollers thus taking the form of disks, and the layer of material thus becoming correspondingly thicker. To confine the latter, I provide one of the rollers with flanges, forming a groove, in which the face or edge of the other roller runs, and the material to be manipulated is placed between them.

To prevent binding of the work-piece or material, and consequent cutting and damage to the same between the edges of the plain or male roller and the sides of the groove on the female roller, I make the groove slightly narrower toward the edges of the flanges—*i. e.*, a little wider at the bottom of the groove or the face of the female roller than at a place farther away from its center, and therefore wider also than the face of the plain or male roller. The outer edges of the flanges forming the groove are bent outward at a considerable angle in bell-mouth shape, so that the section of the groove takes the form of a dovetail at the bottom and bell-mouth at the top or edges.

To insure a close and easy fit of the male roller in the lower part of the groove, I insert a continuous strip of some flexible material—such as leather, rubber, and the like—near the working-face, so as to protrude laterally. The grooved or female roller is always placed uppermost.

In the drawing, M represents the cloth or other material out of which moisture is to be squeezed. R is the plain or male roller, and R' the grooved or female roller. The rollers are supported on axles A and A', the latter having fixed bearings in the frame F of the machine, and the former, or axle of the male roller, is carried by the lever L L', centered at C, one arm, L', of which is held by the spring S, the tension of which can be regulated by the set-screw K. T is a trough, through which the cloth M passes over the friction-rollers $r$, $r'$, and $r''$. P is the driving-pulley. B are the packing-pieces, and E the edges or flanges forming the groove on the female roller R'. By the increased or decreased tension of the spring S, the roller R may be made to press more or less on the material M in the groove of the roller R'.

The drawing illustrates a machine as adapted to be used by bleachers, dyers, and others; but it is clear that its shape, proportions, and other details may be considerably varied without affecting its general arrangement.

Having now described my invention, I claim as new and desire to secure by Letters Patent—

As an improvement in squeezing-machines, the combination of narrow metal or other rollers, the upper one having a groove, the bottom and top parts of which are of dovetail and bell-mouth shape, respectively, with the plain or male roller, having a packing near the working-face working against the sides of the groove.

WILLIAM BIRCH.

Witnesses:
   A. HILDEBRANDT,
   E. BUTLER ROWLEY.